(12) United States Patent
Keller et al.

(10) Patent No.: US 9,264,946 B2
(45) Date of Patent: Feb. 16, 2016

(54) HOMOGENEOUS CIRCUIT SWITCHED VOICE SUPPORT INDICATION IN A MOBILE NETWORK

(71) Applicant: Telefonaktiebolaget L M Ericsson (publ), Stockholm (SE)

(72) Inventors: Ralf Keller, Wurselen (DE); Peter Hedman, Helsingborg (SE); Fredrik Lindholm, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 14 days.

(21) Appl. No.: 13/879,526

(22) PCT Filed: Apr. 12, 2013

(86) PCT No.: PCT/EP2013/057712
§ 371 (c)(1),
(2) Date: Jan. 13, 2014

(87) PCT Pub. No.: WO2014/166548
PCT Pub. Date: Oct. 16, 2014

(65) Prior Publication Data
US 2014/0307706 A1    Oct. 16, 2014

(51) Int. Cl.
*H04W 36/00* (2009.01)
*H04W 8/04* (2009.01)

(52) U.S. Cl.
CPC .......... *H04W 36/0022* (2013.01); *H04W 8/04* (2013.01)

(58) Field of Classification Search
CPC .......................... H04W 36/0022; H04W 8/04
See application file for complete search history.

(56) References Cited

U.S. PATENT DOCUMENTS

2012/0327852 A1* 12/2012 Zisimopoulos et al. ...... 370/328
2015/0056986 A1*  2/2015 Kim et al. ................. 455/432.1

FOREIGN PATENT DOCUMENTS

| EP | 2 451 220 A1 | 5/2012 |
| WO | WO 2011/000672 A1 | 1/2011 |
| WO | WO 2011000672 A1 | 1/2011 |

(Continued)

OTHER PUBLICATIONS

3GPP TS 23.292 v12.1.0 (Mar. 2013).*

(Continued)

*Primary Examiner* — Jae Y Lee
(74) *Attorney, Agent, or Firm* — Myers Bigel Sibley & Sajovec, P. A.

(57) ABSTRACT

A subscriber database maintains a data record related to a user equipment. The subscriber database receives an indication from a control node which is responsible for controlling a plurality of packet switched network accesses. The indication indicates whether voice communication with the user equipment over circuit switched access is supported or unsupported homogeneously for all the network accesses controlled by the control node. The subscriber database stores the indication in the data record. If the subscriber database receives a request from a termination control node which is responsible for controlling termination of a voice session with the user equipment, it processes the request depending on the stored indication. In some cases, if the indication indicates that voice communication with the user equipment over circuit switched access is unsupported homogeneously, the subscriber database may reject the request without further interaction with other nodes.

22 Claims, 11 Drawing Sheets

(56) References Cited

FOREIGN PATENT DOCUMENTS

| WO | WO 2011/087331 A2 | 7/2011 |
|---|---|---|
| WO | WO 2012/113842 A1 | 8/2012 |

OTHER PUBLICATIONS

3GPP TS 23.002 V12.1.0 (Dec. 2012); Technical Specification, "3rd Generation Partnership Project; Technical Specification Group Services and System Aspects; Network architecture (Release 12)", 105pp.

3GPP TS 23.008 V11.7.0 (Mar. 2013); Technical Specification, "3rd Generation Partnership Project; Technical Specification Group Core Network and Terminals; Organization of subscriber data (Release 11)", 110pp.

3GPP TS 23.060 V12.0.0 (Mar. 2013); Technical Specification, "3rd Generation Partnership Project; Technical Specification Group Services and System Aspects; General Packet Radio Service (GPRS); Service description Stage 2 (Release 12)", 338pp.

3GPP TS 23.228 V12.0.0 (Mar. 2013); Technical Specification, "3rd Generation Partnership Project; Technical Specification Group Services and System Aspects; IP Multimedia Subsystem (IMS); Stage 2 (Release 12)", 290pp.

3GPP TS 23.237 V12.2.0 (Mar. 2013); Technical Specification, "3rd Generation Partnership Project; Technical Specification Group Services and System Aspects; IP Multimedia Subsystem (IMS) Service Continuity; Stage 2 (Release 12)", 169pp.

3GPP TS 23.272 V11.4.0 (Mar. 2013); Technical Specification, "3rd Generation Partnership Project; Technical Specification Group Services and System Aspects; Circuit Switched (CS) fallback in Evolved Packet System (EPS); Stage 2 (Release 11)", 91pp.

3GPP TS 23.292 V12.0.0 (Dec. 2012); Technical Specification, "3rd Generation Partnership Project; Technical Specification Group Services and System Aspects; IP Multimedia Subsystem (IMS) centralized services; Stage 2 (Release 12)", 119pp.

3GPP TS 23.292 V12.1.0 (Mar. 2013); Technical Specification, "3rd Generation Partnership Project; Technical Specification Group Services and System Aspects; IP Multimedia Subsystem (IMS) centralized services; Stage 2 (Release 12)", 120pp.

3GPP TS 23.333 V11.1.0 (Dec. 2012); Technical Specification, "3rd Generation Partnership Project; Technical Specification Group Core Network and Terminals; Multimedia Resource Function Controller (MRFC)—Multimedia Resource Function Processor (MRFP) Mp interface: Procedures Descriptions (Release 11)", 100pp.

3GPP TS 23.401 V12.0.0 (Mar. 2013); Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 290pp.

3GPP TS 24.173 V11.5.0 (Mar. 2013); Technical Specification, "3rd Generation Partnership Project; Technical Specification Group Core Network and Terminals; IMS multimedia telephony communication service and supplementary services; Stage 3 (Release 11)", 17pp.

3GPP TS 29.272 V12.0.0 (Mar. 2013); Technical Specification, "3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 12)", 122pp.

Kim et al., "Method for Handling of Voice Over IMS", U.S. Appl. No. 61/621,575, filed Apr. 9, 2012, 41 pages.

Kim et al., "Method for Handling of Voice Over IMS", U.S. Appl. No. 61/643,862, filed May 7, 2012, 53 pages.

Kim et al., "Method for Terminating Access Domain Selection", U.S. Appl. No. 61/620,968, filed Apr. 5, 2012, 14 pages.

Kim et al., "Method for Handling of Voice Over IMS", U.S. Appl. No. 61/620,411, filed Apr. 4, 2012, 14 pages.

Kim et al., "Method for Handling of Voice Over IMS", U.S. Appl. No. 61/619,431, filed Apr. 3, 2012, 11 pages.

Kim et al., "IMS Based Proximity Services", U.S. Appl. No. 61/601,565, filed Feb. 22, 2012, 10 pages.

International Search Report, PCT Application No. PCT/EP2013/057712, Jan. 2, 2014, 4 pages.

3GPP TS 23.272 V9.13.0 (Dec. 2012); 3rd Generation Partnership Project; Technical Specification Group Services and System Aspects; Circuit Switched (CS) fallback in Evolved Packet System (EPS); Stage 2 (Release 9), 73 pages.

3GPP TS 23.060 V9.13.0 (Dec. 2012); 3rd Generation Partnership Project; Technical Specification Group Services and System Aspects; General Packet Radio Service (GPRS); Service description; Stage 2 (Release 9), 303 pages.

3GPP TS 23.401 V9.14.0 (Dec. 2012); 3rd Generation Partnership Project; Technical Specification Group Services and System Aspects; General Packet Radio Service (GPRS) enhancements for Evolved Universal Terrestrial Radio Access Network (E-UTRAN) access (Release 9), 255 pages.

3GPP TS 23.292 V11.4.0 (Sep. 2012); 3rd Generation Partnership Project; Technical Specification Group Services and System Aspects; IP Multimedia Subsystem (IMS) centralized services; Stage 2 (Release 11), 118 pages.

3GPP TS 23.221 V9.5.0 (Dec. 2012); 3rd Generation Partnership Project; Technical Specification Group Services and System Aspects; Architectural requirements (Release 9), 48 pages.

* cited by examiner

HOMOGENEOUS CIRCUIT SWITCHED VOICE SUPPORT INDICATION IN A MOBILE NETWORK

CROSS REFERENCE TO RELATED APPLICATION

This application is a 35 U.S.C. §371 national stage application of PCT International Application No. PCT/EP2013/057712, filed in the English language on 12 Apr. 2013, the disclosure and content of which is incorporated by reference herein in its entirety.

TECHNICAL FIELD

The present invention relates to methods of controlling voice communication of a user equipment in a mobile network and to corresponding devices.

BACKGROUND

Mobile networks are currently evolving from pure circuit switched (CS) networks towards packet switched (PS) networks, in particular Internet Protocol (IP) based networks, and by that integrate into IP based infrastructures that are also used for the Internet, the World Wide Web, and the datacom industry.

More specifically, technologies allowing voice communication over an IP based network have been introduced. Examples of such technologies are Voice over IP (VoIP) via Digital Subscriber Line (DSL) access or Voice over IP via Wireless Local Area Network (WLAN) access. Also in some mobile networks, technologies which allow voice communication over an IP based network are available. Examples of such mobile networks are mobile networks as specified by the $3^{rd}$ Generation Partnership Project (3GPP). For example, a mobile network implement an IP Multimedia Subsystem (IMS) as specified in 3GPP Technical Specification (TS) 23.228 V12.0.0 and offer voice communication as an IMS service.

Further, a concept referred to as IMS Centralized Services (ICS) has been introduced which allow for utilizing IMS services over various types of access networks, including not only PS access networks, but also CS access networks. The ICS concept is for example specified in 3GPP TS 23.292 V12.1.0. Using the ICS concept, the IMS voice services may be available via various kinds of radio access technology (RAT), such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA). Voice communication with a user equipment (UE) which is connected to the mobile network via a CS access network may then be routed through the IMS.

For scenarios where IMS services are usable by a UE both via PS access networks and via CS access networks, a mechanism referred to as Terminating Access Domain Selection (T-ADS) was introduced to select between multiple possible access types for terminating a call to a UE. The T-ADS mechanism is for example specified in 3GPP TS 23.401 V12.0.0, 23.060 V12.0.0, and 23.292 V12.0.0. According to these specifications, T-ADS may be implemented by a Service Centralization and Continuity Application Server (SCC AS) as for example specified in 3GPP TS 23.237 V12.2.0.

The T-ADS functionality of the SCC AS may apply various criteria for selecting between a CS access network or PS access network for terminating an incoming voice session. For example, the SCC AS may obtain capabilities of the most recently used PS access network, e.g., in the form of an "IMS voice over PS session supported indication" and current RAT type, from a subscriber database referred to as Home Subscriber Server (HSS). A corresponding is also described in WO 2011/000672 A1.

If a PS access network is selected for termination and the termination fails, e.g., because it was not possible to allocate sufficient radio resources, then the SCC AS may decide to rather terminate the voice session over a CS access network, i.e., to use Circuit Switched Fallback (CSFB). However, CSFB is not possible in all for a PS access networks, e.g., because no corresponding CS infrastructure is available for certain PS access networks. Accordingly, also termination over CSFB may fail. Such multiple failures of termination may cause a significant delay until the party initiating the call is finally informed that the call cannot be established. Further, such multiple failures also consume precious network resources.

Accordingly, there is a need for techniques which allow for efficiently controlling voice communication of a UE in a mobile network.

SUMMARY

According to an embodiment of the invention, a method for controlling voice communication of a UE in a mobile network is provided. According to the method, a subscriber database maintains a data record related to the UE. The subscriber database receives an indication from a control node which is responsible for controlling a plurality of PS network accesses. The indication indicates whether voice communication with the UE over CS access is supported or unsupported homogeneously for all the network accesses controlled by the control node. The subscriber database stores the indication in the data record. Further, the subscriber database receives a request from a termination control node which is responsible for controlling termination of a voice session with the UE. Depending on the stored indication, the subscriber database processes the received request.

According to a further embodiment of the invention, a method for controlling voice communication of a UE in a mobile network is provided. According to the method, a control node controls a plurality of PS network accesses. Further, the control node determines whether voice communication with the UE over CS access is supported or unsupported homogeneously for all the network accesses controlled by the control node. In accordance with the determination, the control node provides an indication to a subscriber database which maintains a data record related to the UE. The indication indicates whether voice communication with the UE over CS access is supported or unsupported homogeneously.

According to a further embodiment of the invention, a subscriber database for a mobile network is provided. The subscriber database comprises at least one interface, at least one processor, and a memory for maintaining a data record related to a UE. The at least one processor is configured to receive, via the at least one interface, an indication from a control node which is responsible for controlling a plurality of PS network accesses. The indication indicates whether voice communication with the UE over CS access is supported or unsupported homogeneously for all the network accesses controlled by the control node. Further, the processor is configured to store the indication in the data record.

Further, the at least one processor is configured to receive a request via the at least one interface from a termination control node which is responsible for controlling termination of a voice session with the UE. Further, the at least one processor is configured to process the received request depending on the stored indication.

According to a further embodiment of the invention, a control node for a mobile network is provided. The control node comprises a control interface with respect to a plurality of PS network accesses. Further, the control node comprises a database interface to a subscriber database maintaining a data record related to a UE. Further, the control node comprises at least one processor. The at least one processor is configured to control the network accesses via the control interface. Further, the at least one processor is configured to determine whether voice communication with the UE over CS access is supported or unsupported homogeneously for all the network accesses controlled by the control node. Further, the control node is configured to provide, in accordance with the determination, an indication via the database interface to the subscriber database. The indication indicates whether voice communication with the UE over CS access is supported or unsupported homogeneously.

According to a further embodiment of the invention, a computer program product is provided. The computer program product comprises program code to be executed by at least one processor of a subscriber database. Execution of the program code causes the subscriber database to maintain a data record related to a UE. Further, execution of the program code causes the subscriber database to receive an indication from a control node which is responsible for controlling a plurality of PS network accesses. The indication indicates whether voice communication with the UE over CS access is supported or unsupported homogeneously for all the network accesses controlled by the control node. Further, execution of the program code causes the subscriber database to store the indication in the data record. Further, execution of the program code causes the subscriber database to receive a request from a termination control node which is responsible for controlling termination of a voice session with the UE. Further, execution of the program code causes the subscriber database to process the received request depending on the stored indication.

According to a further embodiment of the invention, a computer program product is provided. The computer program product comprises program code to be executed by at least one processor of a control node. Execution of the program code causes the control node to control a plurality of PS network accesses. Further, execution of the program code causes the control node to determine whether voice communication with the UE over CS access is supported or unsupported homogeneously for all the network accesses controlled by the control node. Further, execution of the program code causes the control node to provide, in accordance with the determination, an indication to a subscriber database which maintains a data record related to the UE. The indication indicates whether voice communication with the UE over CS access is supported or unsupported homogeneously.

DETAILED DESCRIPTION OF EMBODIMENTS

In the following, the invention will be explained in more detail by referring to exemplary embodiments and to the accompanying drawings. The illustrated embodiments relate to controlling voice communication of a UE in a mobile network generally supporting both voice communication over PS access and also voice communication over CS access, e.g., a mobile network based on both LTE radio access technology and 2G/3G access technology. However, it is to be understood that the concepts as described herein may also be applied in other types of mobile networks.

Figure 1:
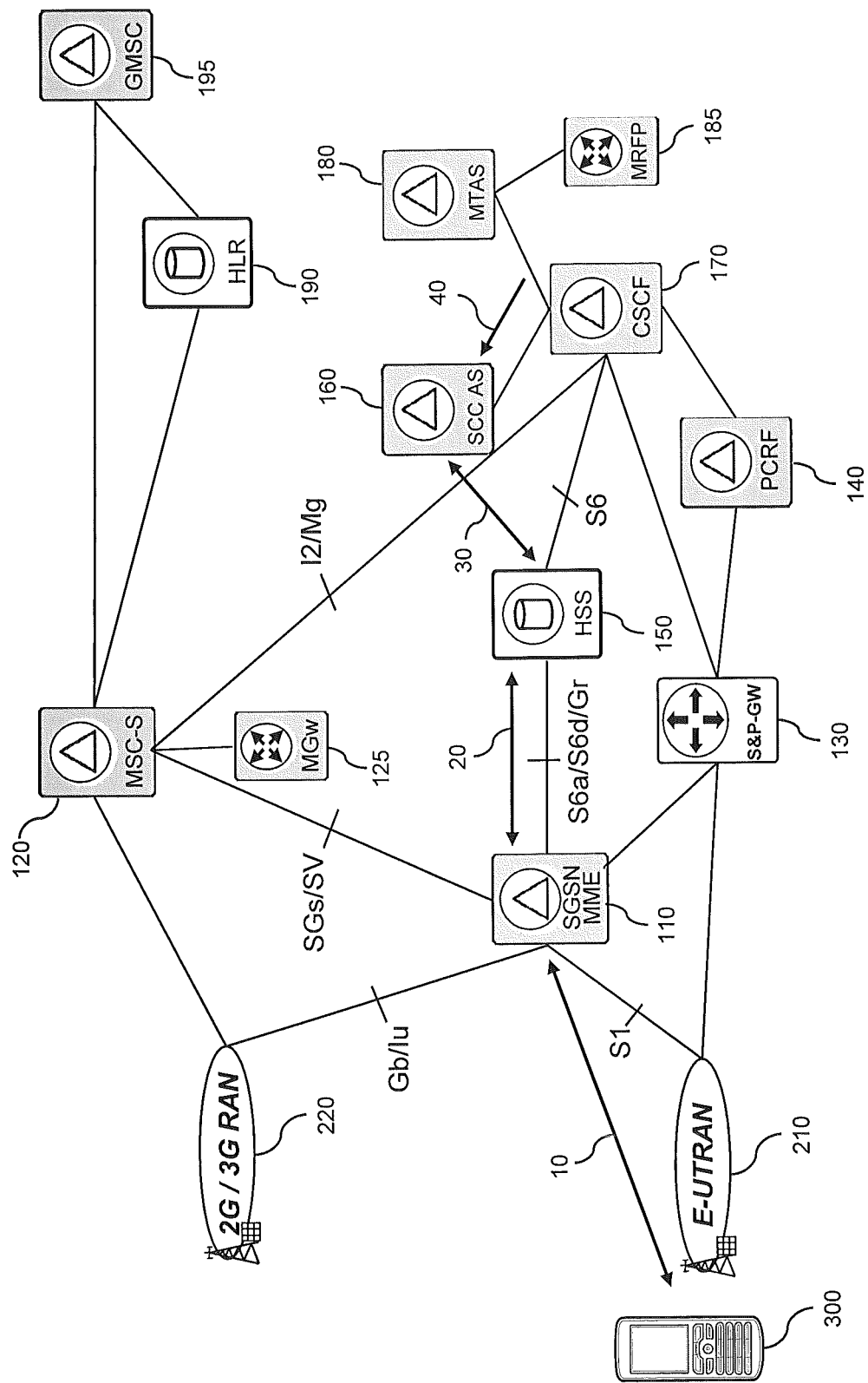
FIG. 1 schematically illustrates a mobile network environment in which concepts according to an embodiment of the invention are implemented.

FIG. 1 schematically illustrates the mobile network. In FIG. 1, E-UTRAN 210 is shown as an example of an LTE access network,providing a plurality of LTE network accesses, and 2G/3G RAN 220 is shown as an example of a 2G/3G access network providing a plurality of 2G and 3G network accesses. The network accesses of the RANs 210, 220 may support voice communication over PS access, CS access, or both. For example, the a 2G or 3G network access in the 2G/3G RAN 220 may support voice communication over both PS access and CS access. An LTE network access in the E-UTRAN 210 may in turn support voice communication over PS access only. However, CSFB for voice may be available for this LTE network access.

The PS access functionalities of the different RANs 210, 220 are controlled by corresponding control nodes. In particular, LTE network accesses may be controlled by control nodes referred to as Mobility Management Entity (MME), and the 2G/3G access networks may be controlled by control nodes referred to as Serving GPRS Support Node (SGSN). By way of example, FIG. 1 illustrates a combined SGSN/MME node 110 as controlling the E-UTRAN 210 and the 2G/3G RAN. However, it should be understood that the mobile network may actually include a plurality of SGSNs for controlling the 2G/3G network accesess, and a plurality of MMEs for controlling the LTE network accesses. Typically, an MME, such as implemented by the control node 110, controls a plurality of LTE network accesses, and an SGSN, such as implemented by the control node 110, controls a plurality of 2G/3G network accesses. The LTE network accesses are organized in Tracking Areas (TAs), and an MME may control several of such TAs. The 2G/3G network accesses are organized in Routing Areas (RAs), and an SGSN may control several of such RAs. Further, it is to be understood that separate control nodes having SGSN functionality may be provided for 2G and 3G RANs, and that also SGSN functionalities may be provided separately from MME functionalities.

Similarly, the CS access functionalities of the 2G/3G network accesses of the 2G/3G RAN 220 are controlled by a switching node 120. For example, the switching node 120 may implement functionalities of an Mobile Switching Center Server (MSC-S) as specified for GSM and UMTS RAT. In the following, the switching node 120 will therefore also be referred to as MSC-S 120. Again, it is to be understood that the mobile network may actually include a plurality of switching nodes having MSC-S functionality.

Accordingly, the mobile network of FIG. 1 includes a PS domain with the E-UTRAN 210, the 2G/3G RAN and the control node 110, and a CS access with the 2G/3G RAN and the switching node 120.

As illustrated, the PS domain further includes a gateway node 130, a policy control node 140, a subscriber database 150, a session continuity application server 160, a call session control node 170, and other application servers, e.g., a multimedia application server 180 which may be coupled to a multimedia processing node 185. The session continuity application server 160, the call session control node 170, and/or the multimedia application server 180 may be part of an Internet Multimedia Subsystem (IMS). The gateway node 130 may be implemented as a Serving Gateway (S-GW) or as a Packet Data Network Gateway (PDN GW). In the following, the gateway node 130 will therefore also be referred to as S-GW 130 or PDN GW 130. The policy control node 140 may be implemented as a Policy and Charging Rules Control Function (PCRF). The call session control node 170 may be implemented as a Call Session Control Function (CSCF), which may include the Proxy CSCF (P-CSCF), the Serving CSCF (S-CSCF), and/or the Interrogating CSCF (I-CSCF) subfunctions. In the following, the call session control node 170 will also be referred to as CSCF 170 or, according to its particular subfunction, as P-CSCF 170 or S-CSCF 170. The multimedia application server 180 may be a Multimedia Telephony Application Server (MTAS) according to 3GPP TS 24.173 V11.5.0 and the multimedia processing node may be a Multimedia Resource Function Processor (MRFP) according to 3GPP TS 23.333 V11.1.0.

The subscriber database 150 is configured to store subscriber data. For this purpose, the subscriber database is associated with a particular subscription associated with the UE 300, e.g., by inserting a Subscriber Identity Module (SIM) card of a subscriber into the UE 300. . In other words, the subscriber database 150 is a uniquely defined location for storing data relating to a particular subscriber. The subscriber database 150 may be implemented as a Home Subscriber Server (HSS) according to 3GPP TS 23.002 V12.1.0 and 23.008 V11.7.0. In the following, the subscriber database 150 will also be referred to as HSS 150. Further functionalities of the subscriber database 150, which are specific to the concepts as described herein, will be described below. Unless described otherwise, the session continuity application server 160 may implement functionalities of an SCC AS according to 3GPP TS 23.237 V12.2.0 and 23.292 V12.1.0.

As illustrated, the CS domain further includes a media gateway node 125 coupled to the control node 120, a subscriber data register 190, and a gateway switching node 195 The media gateway node 125 may be a Media Gateway (MGw). The subscriber data register 190 may be a Home Location Register (HLR). The gateway switching node 195 may be a Gateway Mobile Switching Center (GMSC).

Further, FIG. 1 schematically illustrates a UE 300. The UE 300 may be any type of mobile communication device, e.g., a mobile phone, a portable computer, or the like. It is assumed that the UE 300 is capable of using different RAT types, in particular the above-mentioned LTE access technology and 2G/3G access technology. Further, it is assumed that the UE 300 is capable of using different access types provided by such RAT types, i.e., PS access and CS access. The capability of using a specific access type may, however, depend on the particular network access the UE 300 is using. For example, voice communication using PS access may be possible for the LTE network accesses of the E-UTRAN 210, but only for some of the 2G/3G network accesses of the 2G/3G RAN 220. However, voice communication using PS access may also be not supported for some of the LTE network accesses. Further, some of the LTE network acesses may support fallback to CS voice while other ones of the LTE network accesses fallback to CS voice is not supported, e.g., because there is no corresponding CS infrastructure available or the subscription of the UE 300 does not allow usage of CS voice with the available CS infrastructure.

The above devices and nodes are coupled to each other as illustrated in FIG. 1. For this purpose, corresponding interfaces are provided between these nodes. For example, the MME 110 may be coupled to the LTE network accesses of the E-UTRAN 210 using the S1 interface. The MME 110 may be coupled to the HSS 150 using the S6a interface. The SGSN 110 may be coupled to the 2G network accesses of the 2G/3G RAN 220 using the Gb interface, and the SGSN 110 may be coupled to the 3G network accesses of the 2G/3G RAN 220 using the Iu interface. The SGSN 110 may be coupled to the HSS 150 using the S6d interface or Gr interface. The SCC AS 160 may be coupled to the HSS 150 using the Sh interface. The SGSN/MME 110 may be coupled to the MSC-S 120 using the SGs or SV interface. The MSC-S 120 may be coupled to the CSCF 170 using the I2 or Mg interface.

Figure 2:
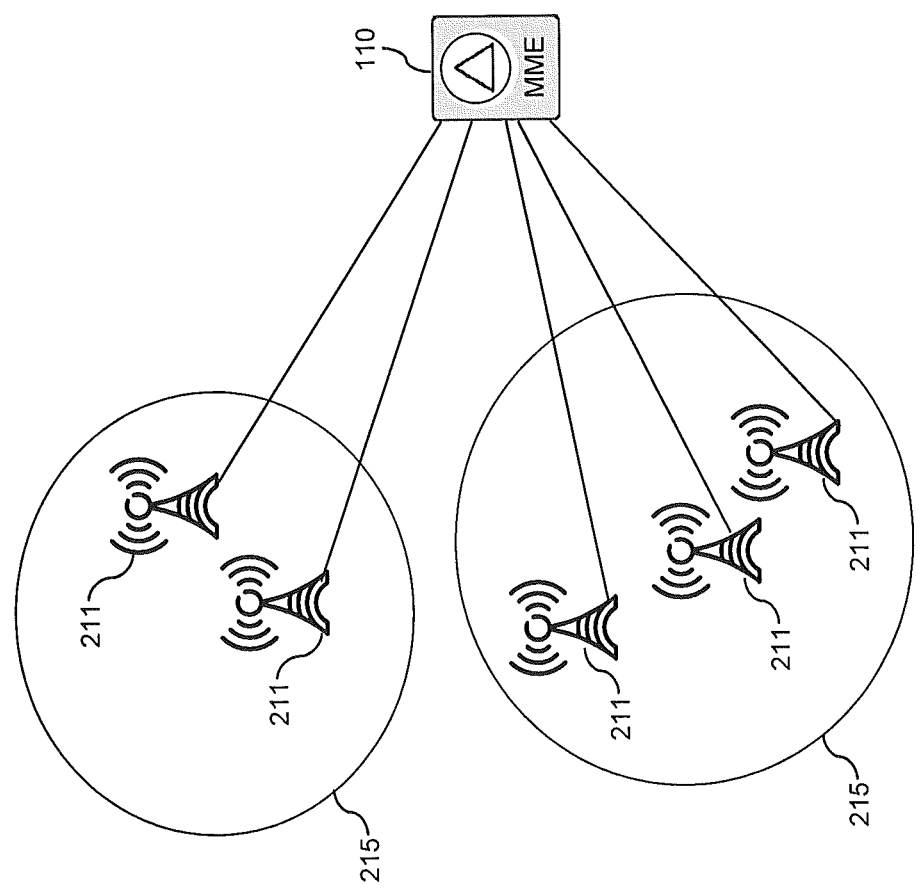
FIG. 2 schematically illustrates an exemplary scenario in which a control node controls a plurality of PS network accesses.

FIG. 2 further illustrates control of the LTE PS network accesses by the MME 110. As illustrated, the LTE network accesses may be provided by a plurality of base stations 211. In the LTE RAT, such base station 211 is referred to as evolved Node B (eNB). As illustrated, the MME 110 controls the plurality of base stations 211. As further illustrated, the base stations 211 controlled by the MME 110 may be organized in multiple TA lists 215.

It should be understood that in practice typically a significantly larger number of LTE base stations is controlled by one MME, and that the MME may also control a significantly larger number of TA lists.

Figure 3:
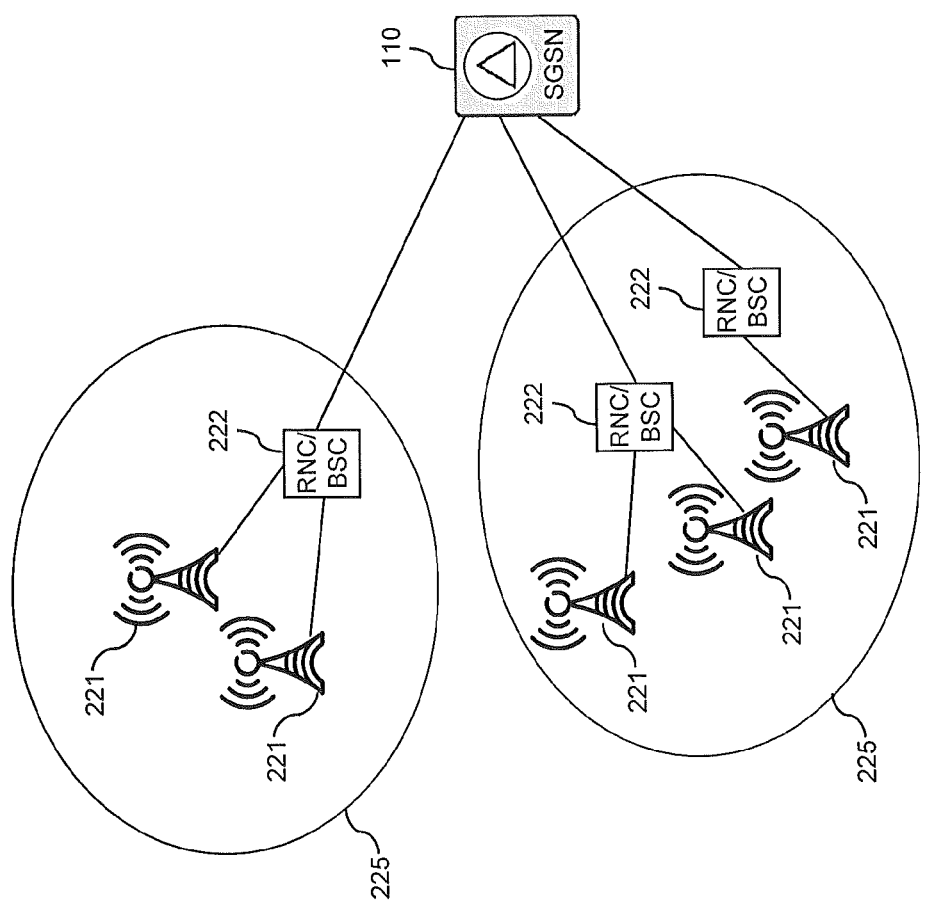
FIG. 3 schematically illustrates an further exemplary scenario in which a control node controls a plurality of PS network accesses.

FIG. 3 further illustrates control of the 2G/3G PS network accesses by the SGSN 110. As illustrated, the 2G/3G network accesses may be provided by a plurality of base stations 221. In the 2G RAT, such base station 221 is referred to as evolved Radio Base Station (RBS). In the 3G RAT such base station 221 is also referred to as Node B (NB). As illustrated, the SGSN 110 controls the plurality of base stations 221. This is accomplished via intermediate control nodes 222, which in turn may control multiple base stations 221. As further illustrated, the base stations 221 controlled by the SGSN 110 may be organized in multiple RAs 225.

It should be understood that in practice typically a significantly larger number of 2G/3G base stations is controlled by one SGSN, and that the SGSN may also control a significantly larger number of RAs.

In order to allow for efficient termination of voice sessions, an indication whether voice communication over PS access is supported or not may be used. More specifically, when attaching to a PS network access or when performing a RA or TA update, the corresponding control node, e.g., the control node 110, may provide an "IMS voice over PS session supported" indication to the UE 300. The "IMS voice over PS session supported indication" informs the UE 300 whether IMS voice over PS session is supported in a list of TAs or in an RA corresponding to the PS network access currently used by UE 300. The control node 110 may also provide a corresponding indication to the HSS 150. This may be accomplished upon request from the HSS 150. Further, the control node 110 may also indicate to the HSS 150 whether voice communication with the UE 300 over PS access is homogeneously supported or unsupported for all PS network accesses controlled by the control node 110, e.g., as specified in 3GPP TS 23.060 V12.0.0 Section 5.3.8A. In this connection, the support is considered to be homogeneous if voice communication over PS access is supported for all PS network accesses controlled by the control node 110. Similarly, voice communication over PS access may also be indicated as homogeneously unsupported, i.e., not supported in any of the PS network accesses controlled by the control node 110.

SCC AS 160 can retrieve, among other information, the information whether voice communication over PS access is supported or unsupported from the HSS 150 when interrogating for the attach status of the UE 300. The SCC AS 160 may then use this information when deciding how to terminate an incoming voice call. If voice communication over PS access with the UE 300 is supported, the SCC AS 160 may decide to terminate the call over PS access. If voice communication over PS access with the UE 300 is unsupported, the SCC AS 160 will decide to terminate the call over CS access. The HSS 150 may evaluate the above indication whether voice communication over PS access is supported homogeneously to provide the SCC AS 160 with the information. If there is no indication of voice communication over PS access being supported or unsupported homogeneously, the HSS 150 may request from the MME/SGSN 110 whether voice communication over PS access is supported in the RA/TA list corresponding to last used PS network access. In this way, the SCC AS 160 may efficiently determine whether termination via PS access is possible for a specific incoming call to the UE 300.

However, in some cases termination of a call via PS access may fail, even if voice communication over PS access was indicated to be supported. For example, allocation of radio resources for the terminating leg of the call may fail in the for the PS network access currently used by the UE 300. This may for example be due to a high load in the cell of the PS network access. Accordingly, the support of voice communication over PS access as indicated does not ensure that termination of a call over PS access will always be successful. In the case of such failed termination over PS access, the SCC AS 160 may proceed by attempting termination over CS access, i.e., which will require CSFB for terminating the call.

In this case, the SCC AS 160 typically requests a CS routing number (CSRN), sometimes also referred to as Mobile Switched Routing Number (MSRN), from the HSS 150. The HSS 150 may in turn attempt to obtain the CSRN from the MSC-S 120 serving the UE 300.

According to concepts as further explained in the following, such termination attempts over CS access may be efficiently controlled by providing the HSS 150 with an indication whether voice communication with the UE 300 over CS access is supported or unsupported homogeneously. In this connection, the support is considered to be homogeneous if voice communication over CS access is supported for all the PS network accesses controlled by the control node 110. Similarly, voice communication over CS access may also be indicated as homogeneously unsupported, i.e., not supported for any of the PS network accesses controlled by the control node 110. Here, it should be understood that support of voice communication over CS access does not need to be supported by the PS network access itself, but may be supported by a CS network access located in the coverage area of the PS network access. The latter situation may in particular apply for the LTE network accesses, which offer no own CS access functionality. In the case of the 2G/3G network accesses, the same network access may provide both PS access functionality and CS access functionality.

The control node 110 provides the HSS 150 with the indication whether voice communication with the UE 300 over CS access is supported or unsupported homogeneously. This may be accomplished in response to the UE 300 having requested a combined attach to the PS domain and to the CS domain, e.g., a combined EPS/IMSI attach as specified in 3GPP TS 23.272 V11.4.0 or a combined GPRS/IMSI attach as specified in 3GPP TS 23.060 V12.0.0. However, cases are excluded in which the combined PS/CS attach is requested for "SMS only". In particular, if the combined PS/CS attach procedure is completed successfully, the control node 110 may determine that voice communication with the UE 300 over CS access is supported at least for the currently used PS network access. If the combined PS/CS attach procedure is not successful with respect to the CS domain, the control node 110 may determine that voice communication with the UE 300 over CS access is not supported at least in the currently used PS network access. In the case of the combined EPS/IMSI attach procedure of 3GPP TS 23.272 or the combined GPRS/IMSI attach procedure of 3GPP TS 23.06, the attach may also be performed with the limitation "SMS only". Also in this case, the control node 110 may determine that voice communication with the UE 300 over CS access is not supported at least for the currently used PS network access.

To determine whether voice communication with the UE 300 over CS access is supported or unsupported homogeneously, the control node 110 may further check if the combined attach procedure would be successful for the other PS network accesses controlled by the control node 110. That is to say, if the control node 110 implements MME functionality, it may perform this check for all controlled TA lists, and if the control node implements SGSN functionality, it may perform this check for all controlled RAs. For this purpose, the control node 110 may for example assess the capabilities of its controlled PS network accesses. Corresponding information on the capabilities is typically available at the control node 110. The control node 110 may also keep track of changes of whether voice communication with the UE 300 over CS access is supported or unsupported homogeneously, e.g., due to changes in the subscription status of the UE 300 or changes in the network policies.

The indication whether voice communication with the UE 300 over CS access is supported or unsupported homogeneously may for example be provided to the HSS 150 in an Update Location request as specified in 3GPP TS 29.272 V12.0.0. Updates of the indication whether voice communication with the UE 300 over CS access is supported or unsupported homogeneously may for example be provided to the HSS 150 in an Update Location request as specified in 3GPP TS 29.272 V12.0.0.

The HSS 150 may then use the indication efficiently processing requests related to CS connections to the UE 300.

Specifically, the knowledge may be used to avoid unsuccessful attempts of CS termination or requests whether CS termination is possible.

Figure 4:
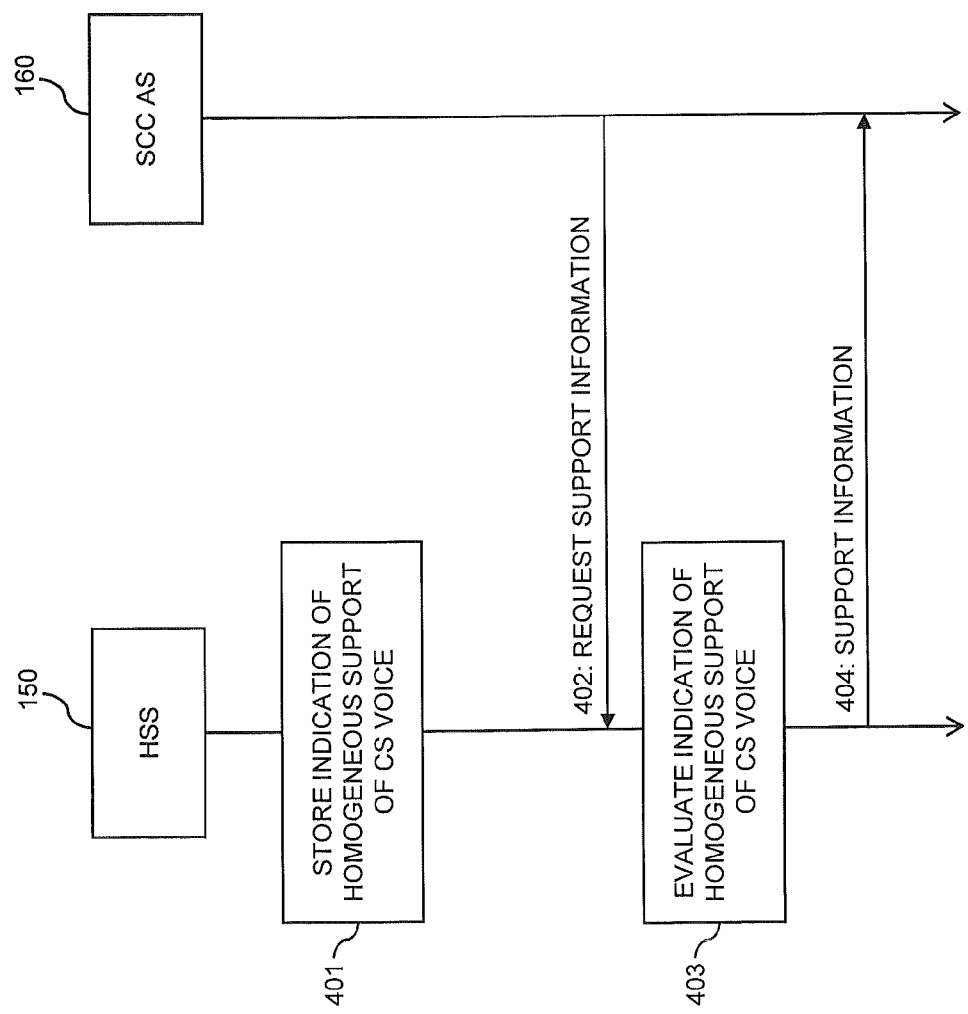
FIG. 4 shows exemplary procedures in accordance with an embodiment of the invention, which involve processing a request depending on an indication of homogeneous support of CS voice communication for a UE.

FIG. 4 shows a signaling diagram for illustrating exemplary procedures in accordance with the above described concepts. The procedures of FIG. 4 involve the HSS 150, and the SCC AS 160.

In the procedures of FIG. 4, the HSS stores the indication whether voice communication with the UE 300 over CS access is supported or unsupported homogeneously, as indicated by step 401. In the following, this indication will also be referred to as indication of homogeneous support of CS voice.

It is now assumed, that the SCC AS 160 may need to terminate a call to the UE 300. The SCC AS 160 may therefore send a request 402 for support information to the HSS 150. In particular, the SCC AS 160 may request information whether voice communication with the UE 300 over CS access is supported or unsupported. The SCC AS 160 may utilize such support information to determine whether termination of the call over CS access is possible, e.g., in cases where termination over PS access is found to be not possible.

The HSS 150 may evaluate the stored indication of homogeneous support of CS voice to determine the requested support information, as indicated by step 403. Since the indication of homogeneous support of CS voice is valid for a plurality of PS network accesses, the HSS 150 does not need to obtain information from other nodes to process the request 402, even if the UE 300 moves between different PS network accesses. In particular, if homogeneous support of CS voice is indicated, the HSS 150 may determine that voice communication with the UE 300 over CS access is also supported in the current PS network access used by the UE 300. If CS voice is indicated to unsupported homogeneously, the HSS 150 may determine that voice communication with the UE 300 over CS access is also not supported in the current PS network access used by the UE 300.

Having determined the requested support information, the HSS 150 may send the support information to the SCC AS 160, as indicated by message 404.

Figure 5:
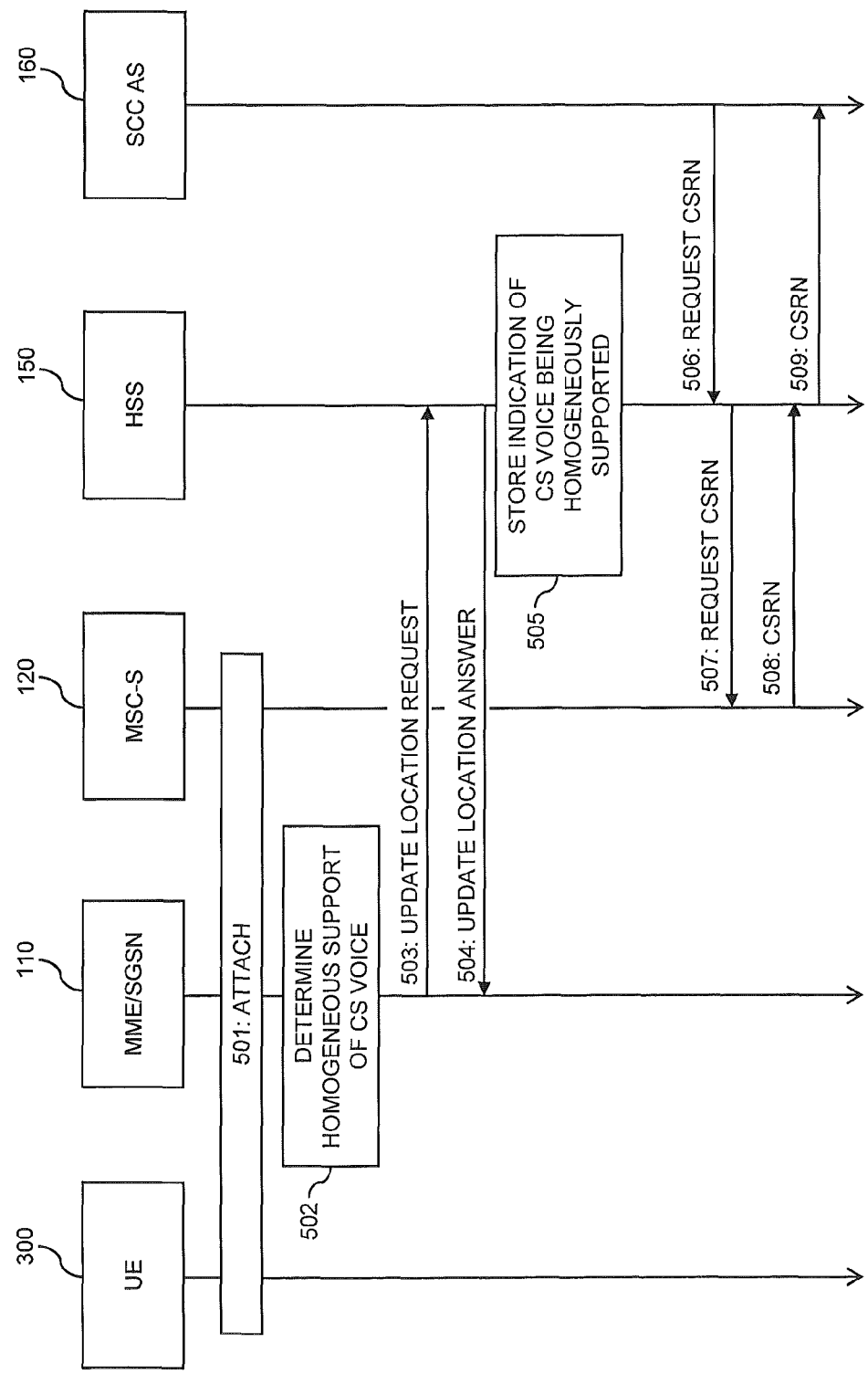
FIG. 5 shows exemplary procedures in accordance with an embodiment of the invention for a case where CS voice communication with a UE is homogeneously supported.

FIG. 5 shows a signaling diagram for illustrating further exemplary procedures in accordance with the above described concepts. The procedures of FIG. 5 involve the UE 300, the control node 110, the switching node 120, the HSS 150, and the SCC AS 160.

At step 501, a combined PS/CS attach procedure is performed, e.g., combined EPS/IMSI attach procedure as specified in 3GPP TS 23.272 V11.4.0 or a combined GPRS/IMSI attach as specified in 3GPP TS 23.060 V12.0.0. The attach procedure may be an initial attach procedure performed when the UE 300 first attaches to the mobile network or may be performed when the UE 300 moves from another network access to one of the PS network accesses controlled by the control node 110, e.g., in the course of a handover involving a change of MME or SGSN. In the example of FIG. 5, it is assumed that the combined PS/CS attach procedure is completed successfully also with respect to the CS domain, without limitation to "SMS only". Accordingly, voice communication with the UE 300 over CS access is supported at least for the network access to which the UE 300 is currently attached.

At step 502, the control node 110 determines whether the support of voice communication over CS access is homogeneous. For this purpose, the control node 110 considers the capabilities of its controlled PS network accesses. If voice communication over CS access is supported for all the PS network accesses controlled by the control node 110, the support is homogeneous.

The control node 110 then indicates to the HSS 150 that voice communication with the UE 300 over CS access is homogeneously supported to the HSS 150. This is accomplished in an Update Location Request 203, e.g., as specified in 3GPP TS 29.272 V12.0.0. In particular, the Update Location Request 203 may include an indication "Homogeneous Support of Voice over CS Sessions" with a value set to "Supported".

The HSS 150 may respond to the Update Location Request 503 with an Update Location Answer 504, e.g., as specified in 3GPP TS 29.272 V12.0.0. Further, the HSS 150 stores the indication received with the Update Location request 503 in a data record related to the UE 300, as indicated by step 205.

If in the following the SCC AS 160 decides to attempt CS termination of a call to the UE 300, e.g., after failure to terminate the call over PS access, the SCC AS 160 may send a request 506 for a CSRN to the HSS 150.

The HSS 150 then checks the indication stored at step 505. Since the indication indicates that voice communication with the UE 300 over CS access is supported, the HSS 150 decides to proceed with processing the request 506 for the CSRN by sending a request 507 for the CSRN to the MSC-S 120. In the example of FIG. 5, the MSC-S 120 then sends a response 508 with the CSRN to the HSS 150.

The HSS 150 may then in turn send a response 509 with the CSRN to the SCC AS 160, which may then proceed with the CS termination procedure, using the received CSRN.

Figure 6:
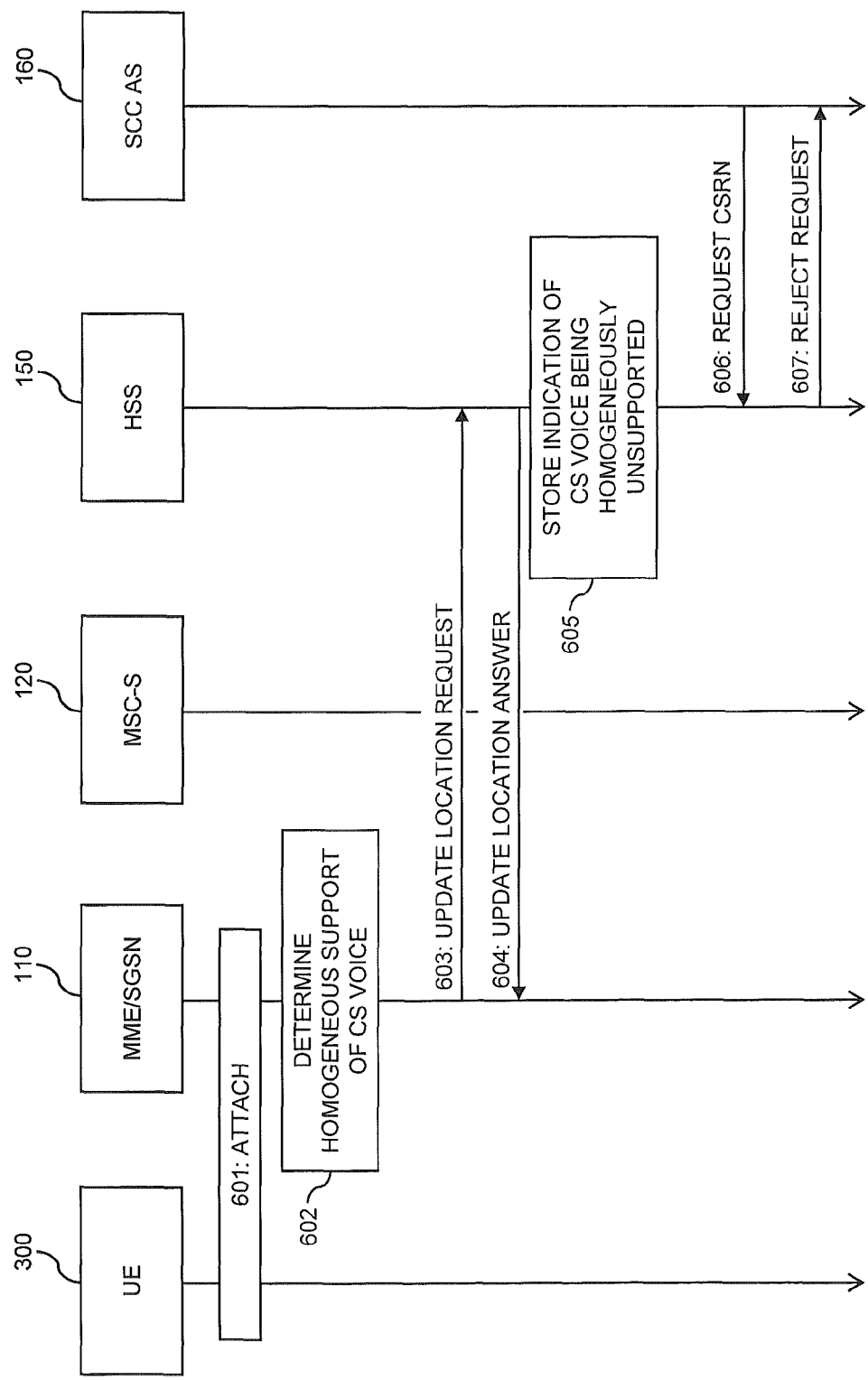
FIG. 6 shows exemplary procedures in accordance with an embodiment of the invention for a case where CS voice communication with a UE is homogeneously unsupported.

FIG. 6 shows a signaling diagram for illustrating further exemplary procedures in accordance with the above described concepts. The procedures of FIG. 6 involve the UE 300, the control node 110, the switching node 120, the HSS 150, and the SCC AS 160.

At step 601, a combined PS/CS attach procedure is performed, e.g., combined EPS/IMSI attach procedure as specified in 3GPP TS 23.272 V11.4.0 or a combined GPRS/IMSI attach as specified in 3GPP TS 23.060 V12.0.0. The attach procedure may be an initial attach procedure performed when the UE 300 first attaches to the mobile network or may be performed when the UE 300 moves from another PS network access to one of the PS network accesses controlled by the control node 110, e.g., in the course of a handover involving a change of MME or SGSN. In the example of FIG. 6, it is assumed that the combined PS/CS attach procedure is completed successfully only with respect to the CS domain. Accordingly, voice communication with the UE 300 over CS access unsupported at least for the PS network access to which the UE 300 is currently attached.

At step 602, the control node 110 determines whether the lack of support of voice communication over CS access is homogeneous. For this purpose, the control node 110 considers the capabilities of its controlled PS network accesses. If voice communication over CS access is unsupported for all the PS network accesses controlled by the control node 110, the lack of support is homogeneous.

The control node 110 then indicates to the HSS 150 that voice communication with the UE 300 over CS access is homogeneously unsupported to the HSS 150. This is accomplished in an Update Location Request 603, e.g., as specified in 3GPP TS 29.272 V12.0.0. In particular, the Update Location Request 603 may include an indication "Homogeneous Support of Voice over CS Sessions" with a value set to "Not Supported".

The HSS 150 may respond to the Update Location Request 603 with an Update Location Answer 604, e.g., as specified in 3GPP TS 29.272 V12.0.0. Further, the HSS 150 stores the indication received with the Update Location request 603 in a data record related to the UE 300, as indicated by step 605.

If in the following the SCC AS 160 decides to attempt CS termination of a call to the UE 300, e.g., after failure to terminate the call over PS access, the SCC AS 160 may send a request 606 for a CSRN to the HSS 150.

The HSS 150 then checks the indication stored at step 305. Since the indication indicates that voice communication with the UE 300 over CS access is unsupported, the HSS 150 decides to reject the request 606 for the CSRN by sending a reject message 607 to the MSC-S 120. The reject message 607 may also indicate a reason for rejection, e.g., that voice communication over CS access is unsupported.

As can be seen from the exemplary procedures of FIGS. 4, 5, and 6, the indication whether voice communication is supported or unsupported homogeneously may be used for efficiently controlling the voice communication with the UE 300. In particular, signaling procedures related to establishing a CS leg of an incoming call may be avoided if voice communication over CS access is unsupported and only initiated if support of voice communication over CS access can be expected. Also repeated signaling of support information can be avoided by defining the indication with respect to all network accesses controlled by the control node 110.

If the support of voice communication over CS access is found to be inhomogeneous, i.e., voice communication with the UE 300 over CS access is supported for only some of the network accesses controlled by the control node 110, the indication of homogeneous support may be omitted, e.g., by sending the Location Update Request 503 or 603 without the indication "Homogeneous Support of Voice over CS Sessions". In such cases the HSS 150 may process requests for the CSRN of the UE 300 in a similar way as in the procedures of FIG. 5, e.g., by requesting the CSRN from the MSC-S 120.

Figure 7:
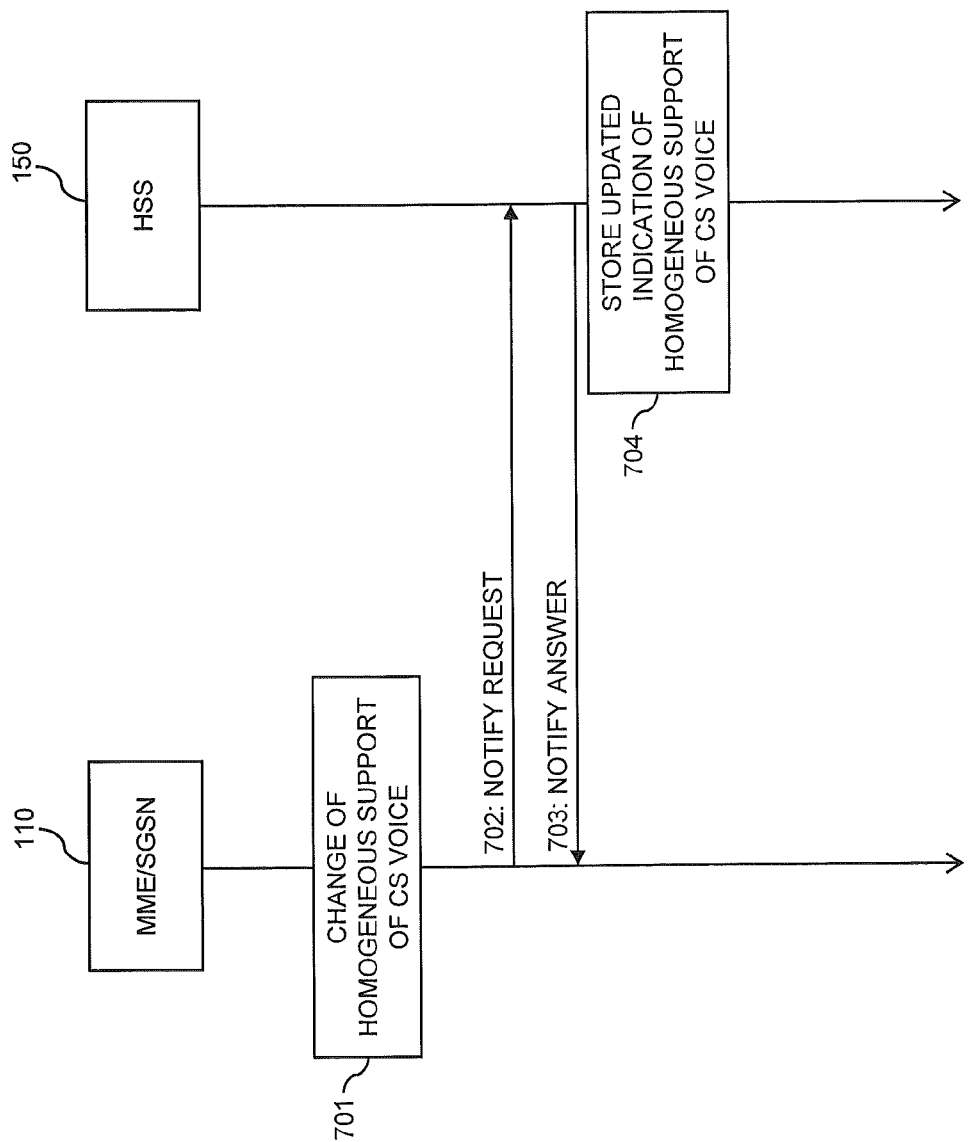
FIG. 7 shows exemplary procedures in accordance with an embodiment of the invention which involve an update of an indication of homogeneous support of CS voice communication with a UE.

FIG. 7 shows a signaling diagram for illustrating further exemplary procedures in accordance with the above-described concepts. The procedures involve the control node 110 and the HSS 150. The procedures relate to a scenario in which the homogeneous support of voice communication over CS access changes. The procedures may for example be performed after initially storing the indication of homogeneous support of CS voice in the procedures of FIG. 4, 5, or 6.

At step 701, a change of the homogeneous support of voice communication over CS access is detected by the control node 110. The change may for example pertain to all PS network accesses controlled by the control node and be from homogeneously supported to homogeneously unsupported. Further, the change may pertain to only some of the PS network accesses networks controlled by the control node and be from homogeneously supported to inhomogeneously supported or from homogeneously unsupported to inhomogeneously supported. The change may for example be caused by a change in the subscription status of the UE 300 or by a change of traffic policies implemented in the mobile network.

The control node 110 then indicates the change to the HSS 150. This is accomplished in an Notify Request 702, e.g., as specified in 3GPP TS 29.272 V12.0.0. In particular, the Update Location request 702 may indicate an updated value for the indication "Homogeneous Support of Voice over CS Sessions".

The HSS 150 may respond to the Notify Request 702 with an Notify Answer 703, e.g., as specified in 3GPP TS 29.272 V12.0.0. Further, the HSS 150 stores the updated value of the indication "Homogeneous Support of Voice over CS Sessions" the data record related to the UE 300, as indicated by step 704.

If the support of voice communication over CS access changes to inhomogeneous support, the HSS may set the stored value of the indication "Homogeneous Support of Voice over CS Sessions" to "Unknown".

Figure 8:
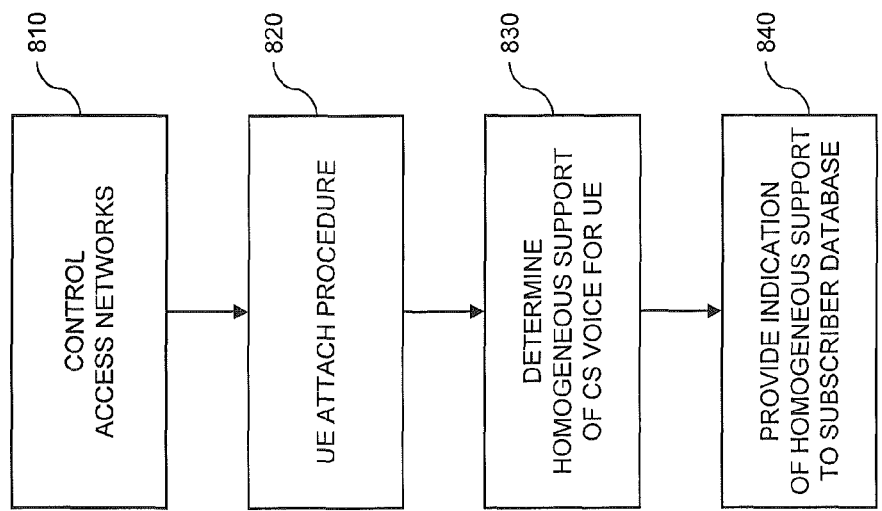
FIG. 8 shows a flowchart for illustrating a method according to an embodiment of the invention.

FIG. 8 shows a flowchart for illustrating a method for controlling voice communication with a UE, e.g., with the UE 300. The method may be used for implementing the above-described concepts in a control node which controls a plurality of PS network accesses, such as the control node 110. The control node may for example implement functionalities of an MME and/or SGSN.

At step 810, the control node controls the network accesses. This may for example involve handling of mobility procedures, such as handovers between the network accesses controlled by the control node or handovers from or to other network accesses, e.g., controlled by other control nodes or network accesses using another RAT. The control node may also be responsible for controlling the establishment of a PS connections from the network accesses to UEs.

At step 820, the control node may perform an attach procedure, e.g., in response to the UE attaching to one of the network accesses controlled by the control node. The attach procedure may for example be a combined PS/CS attach procedure. The attach procedure may relate to an initial attach or to a handover of the UE.

At step 830, the control node determines whether voice communication with the UE over CS access is supported or unsupported homogeneously. In this connection, the support is considered to be homogeneous if voice communication over CS access is supported for all the network accesses controlled by the control node. Voice communication over CS access may also be determined to be homogeneously unsupported, i.e., not supported for any of the network accesses controlled by the control node. If the control node implements control functionalities for multiple RATs, e.g., MME control functionalities for E-UTRAN and SGSN control functionalities for GPRS, the term "all the network accesses" may pertain either to the network accesses of a given RAT or to the network accesses of all RATs.

At step 840, the control node provides an indication to a subscriber database which maintains a data record related to the UE, e.g., to the HSS 150. In accordance with the determination of step 830, the indication indicates whether voice communication with the UE over CS access is supported or unsupported homogeneously. The indication may for example correspond to the indication "Homogeneous Support of Voice over CS Sessions" as explained above.

The indication of step 840 may be provided in response to the UE attaching to one of the network accesses controlled by the control node or in response to the UE moving from another network access, which is not controlled by the control node, to one of the network accesses controlled by the control node, e.g., in response to the attach procedure of step 520. The indication may also be provided in response to a change in the support of voice communication with the UE for at least one of the network accesses controlled by the control node, e.g., due to a change in the subscription status of the UE or due to a change of policy rules implemented in the mobile network.

The indication of step 840 may for example be sent in an Update Location Request or in a Notify Request as specified in 3GPP TS 29.272 V12.0.0.

Figure 9:
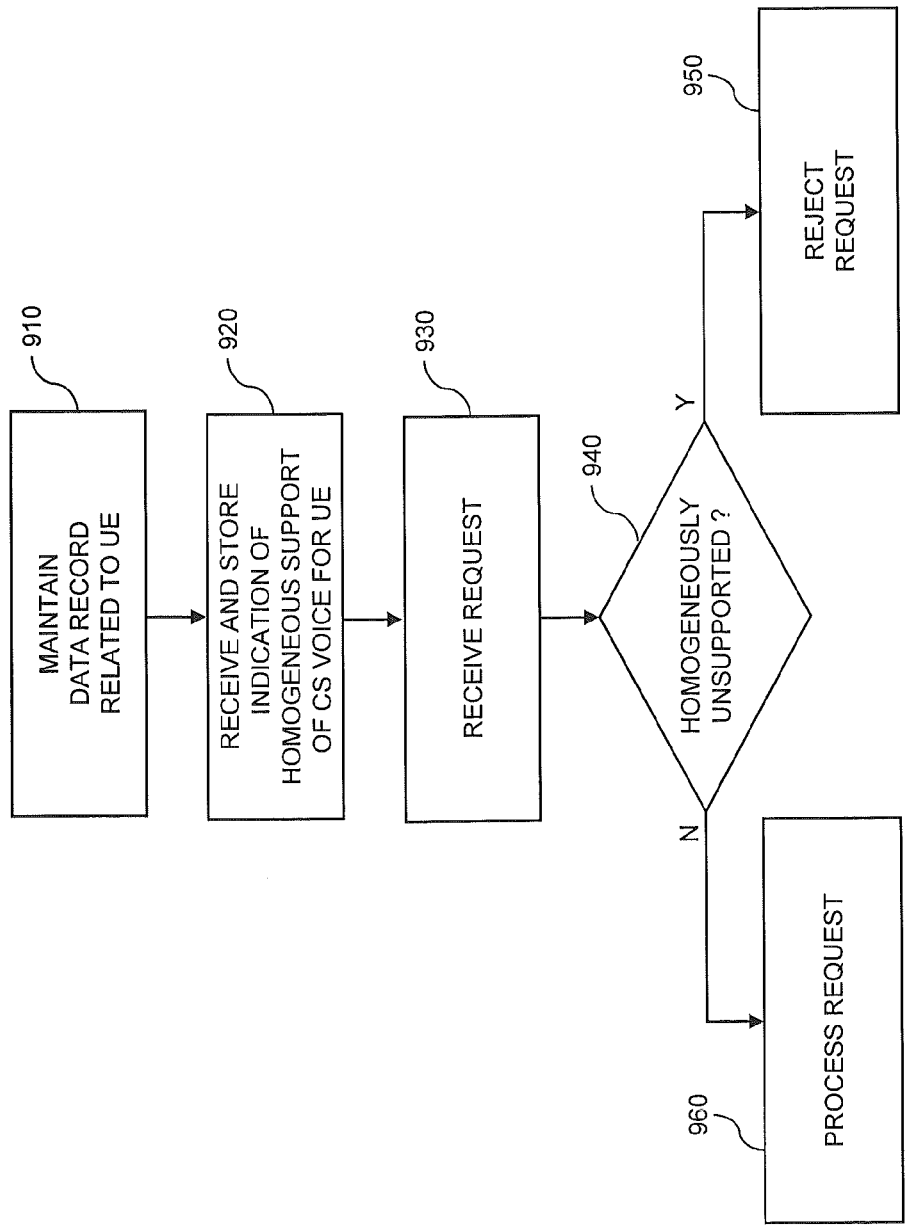
FIG. 9 shows a flowchart for illustrating a further method according to an embodiment of the invention.

FIG. 9 shows a flowchart for illustrating a method for controlling voice communication with a UE, e.g., with the UE 300. The method may be used for implementing the above-described concepts in a subscriber database, such as the HSS 150.

At step 910, the subscriber database maintains a data record related to the UE. This may for example involve storing various kinds of subscription related information such as user identities, authentication data, or the like. Further, also information on location or valid registrations may be stored.

At step 920, the subscriber database receives an indication from a control node which controls a plurality of PS network accesses, such as the control node 110. The indication indicates whether voice communication with the UE over CS access is supported or unsupported homogeneously. In this connection, the support is considered to be homogeneous if voice communication over CS access is supported for all the network accesses controlled by the control node. Voice communication over CS access may also be indicated to be homogeneously unsupported, i.e., not supported for any of the network accesses controlled by the control node. The indication may for example correspond to the indication "Homogeneous Support of Voice over CS Sessions" as explained above. The indication may for example be received in an Update Location Request or in a Notify Request as specified in 3GPP TS 29.272 V12.0.0. Further, the subscriber database stores the received indication in the data record related to the UE. If the control node implements control functionalities for multiple RATs, e.g., MME control functionalities for E-UTRAN and SGSN control functionalities for GPRS, the term "all the network accesses" may pertain either to the network accesses of a given RAT or to the network accesses of all RATs.

At step 930, the subscriber database receives a request from a termination control node. The termination control node is responsible for controlling termination of a voice session with the UE. For example, the termination control node may correspond to the SCC AS 160. The request may for example be a request for a CSRN of the UE. The request may also be for information whether voice communication with the UE over CS access is supported. The subscriber database processes the received request. This is accomplished depending on the stored indication whether voice communication with the UE over CS access is supported or unsupported homogeneously. Steps 940, 950, and 960 illustrate an exemplary way of processing the request which may be applied if the request is a request for the CSRN of the UE.

As indicated by step 940, this processing may involve checking the indication to determine whether voice communication with the UE over CS access is unsupported homogeneously. If this is the case, the method may proceed with step 950, as indicated by branch "Y".

At step 950, in response to the indication indicating that voice communication with the UE over CS access is unsupported homogeneously, the subscriber database may reject the request of step 930. An example of a corresponding procedure is illustrated in FIG. 6.

If the check of step 940 reveals that voice communication with the UE over CS access is not unsupported homogeneously, i.e., supported homogeneously for all the network accesses or inhomogeneously for at least some of the network accesses, the method may proceed with step 960, as indicated by branch "N".

At step 960, in response to the indication indicating that voice communication with the UE over CS access is not unsupported homogeneously, the subscriber database requests the CSRN from a switching node of the mobile network, e.g., from the MSC-S 120. The subscriber database may then receive the CSRN from the switching node and send the CSRN to the termination control node. An example of a corresponding procedure is illustrated in FIG. 5.

If the request is for information whether voice communication with the UE over CS access is supported, the subscriber database may process the request by determining this information from the indication whether voice communication with the UE over CS access is supported or unsupported homogeneously, without a further need to obtain this information from another node. An example of a corresponding procedure is illustrated in FIG. 4.

In some scenarios, the subscriber database may also receive an indication of an update of the indication from the control node. The subscriber database may then store the updated indication in the data record and use the updated indication for processing requests as explained in connection with steps 930, 940, 950, and 960. An exemplary procedure involving an update of the indication is illustrated in FIG. 7.

The methods as described in connection with FIGS. 8 and 9 may be combined with each other. In particular, the method of FIG. 8 may be used to provide the indication or updates thereof as input to the method of FIG. 9.

Figure 10:
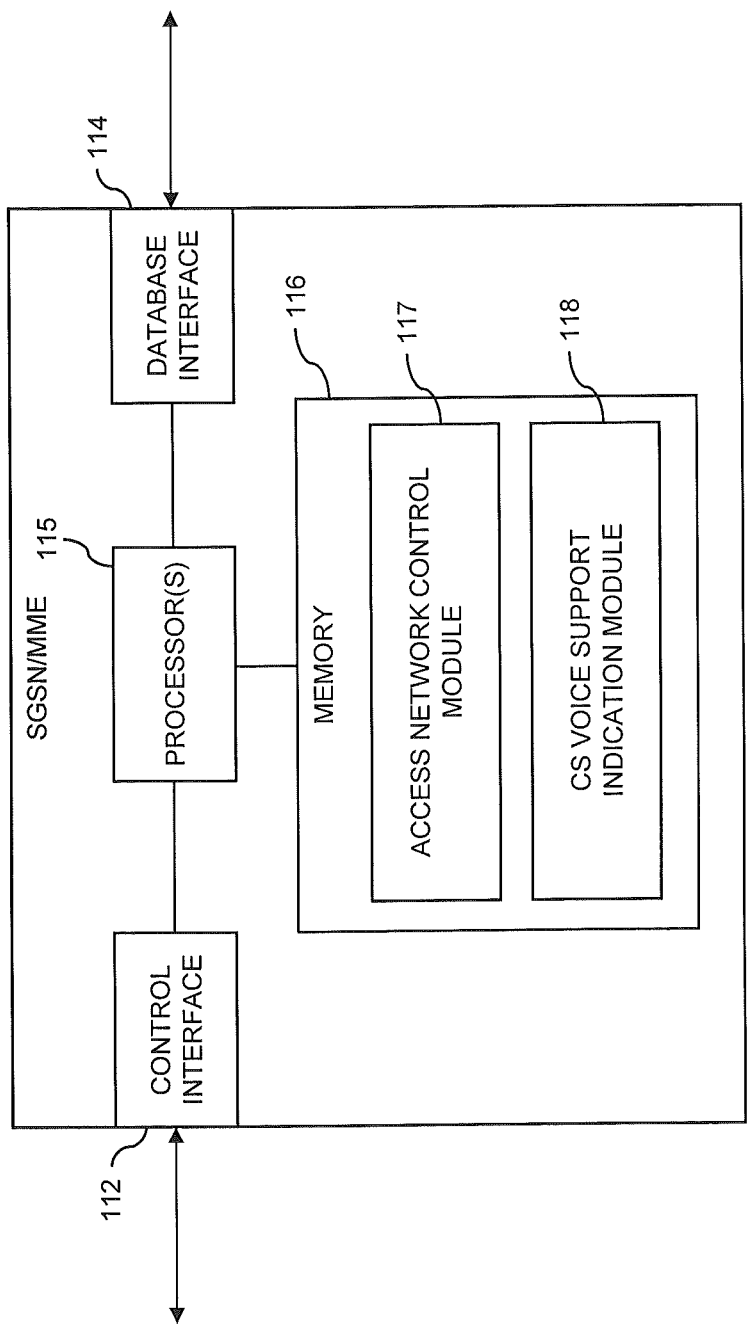
FIG. 10 schematically illustrates a control node according to an embodiment of the invention.

FIG. 10 illustrates exemplary structures for implementation of the above concepts in a control node, e.g., in the control node 110. As explained above, the control node may be configured to be operated as an SGSN or MME.

The control node includes a control interface 112 to plurality of PS network accesses, such as provided by the E-UTRAN 210 or by the 2G/3G RAN 220. If the control node has SGSN functionality, the control interface 112 is with respect to 2G or 3G network accesses and may be implemented by the Gb or Iu interface, respectively. If the control node 160 has MME functionality, the control interface 112 is with respect to LTE network accesses, in particular eNBs, and may be implemented by the S1 interface.

In addition, the control node is provided with a database interface 114 for connecting to a subscriber database, such as the HSS 150. If the control node 160 has SGSN functionality, the database interface 114 may be implemented as the S6d or Gr interface. If the control node 160 has MME functionality, the database interface 114 may be implemented as the S6a interface.

Further, the control node includes at least one processor 115 coupled to the interfaces 112, 114 and a memory 116 coupled to the at least one processor 115. The memory 116 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 116 includes suitably configured program code to be executed by the processor 115 so as to implement the above-described functionalities of the control node 110. More specifically, the memory 116 may include an network access control module 117 so as to implement network access control functionalities, e.g., establishing, modifying or releasing PS connections from the controlled network accesses. Further, the memory may include a CS voice support indication module so as to implement the above-described functionalities of determining and indicating homogeneous support of voice communication with a UE over CS access.

It is to be understood that the structures as illustrated in FIG. 10 are merely schematic and that the control node may actually include further components which, for the sake of clarity, have not been illustrated, e.g., further interfaces or additional processors. Also, it is to be understood that the memory 116 may include further types of program code modules which have not been illustrated, e.g., program code modules for implementing known functionalities of an SGSN or MME.

Figure 11:
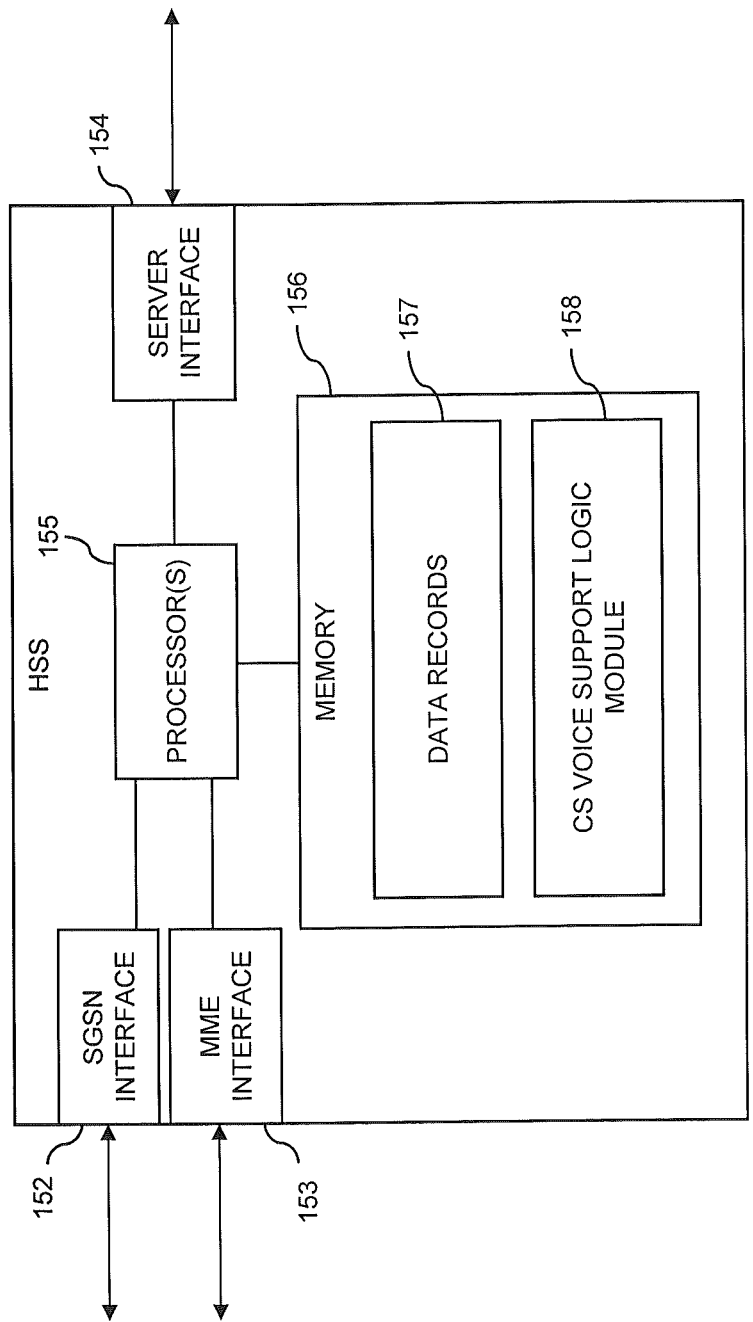
FIG. 11 schematically illustrates a subscriber database according to an embodiment of the invention.

FIG. 11 illustrates exemplary structures for implementation of the above concepts in a subscriber database, e.g., in the subscriber database 150. As explained above, the subscriber database 150 may be configured to be operated as an HSS.

As illustrated, the subscriber database may include a first control node interface 152, which has the purpose of coupling the subscriber database to SGSNs, such as implemented by the control node 110. Further, the subscriber database may include a second control node interface 153, which has the purpose of coupling the subscriber database to MMEs, such as implemented by the control node 110. The first control node interface 152 may be implemented as the S6d or Gr interface. The second control node interface 153 may be implemented as the S6a interface. In some implementations, only one of the first control node interface 152 and the second control node interface 153 may be provided, or these interfaces may be combined in a single interface.

As further illustrated, the subscriber database may include a server interface 154, which has the purpose of coupling the subscriber database 150 to one or more servers, e.g., the SCC AS 160, or other network functions. The server interface 154 may be implemented as the Sh interface.

Further, the subscriber database 150 includes at least one processor 155 coupled to the interfaces 152, 153, 154, and a memory 156 coupled to the at least one processor 155. The memory 156 may include a ROM, e.g., a flash ROM, a RAM, e.g., a DRAM or SRAM, a mass storage, e.g., a hard disk or solid state disk, or the like. The memory 156 includes data and suitably configured program code to be executed by the processor 156 so as to implement the above-described functionalities of the subscriber database. More specifically, the memory 156 may include data records 157 related to UEs. Such data record may specifically store the indication of homogeneous support of voice communication with a certain UE over CS access. Further, the memory 156 may include a CS voice support logic module 158, so as to implement the above-described functionalities of handling and utilizing the indication of homogeneous support of voice communication over CS access.

It is to be understood that the structures as illustrated in FIG. 11 are merely schematic and that the subscriber database may actually include further components which, for the sake of clarity, have not been illustrated. Also, it is to be understood that the memory 156 may include further types of data and program code modules, which have not been illustrated, e.g., program code modules for implementing known functionalities of a HSS.

As can be seen, the concepts as described above may be used for efficiently controlling CS termination procedures. Signaling in connection with termination of a call may be reduced. In some cases the stored indication of homogeneous support of voice communication over CS access may be used by the subscriber database to immediately decide whether or not CS termination should be continued by obtaining the CSRN from a switching node. In this way delays and resource usage due to unsuccessful attempts of CS termination may be avoided.

It is to be understood that the examples and embodiments as explained above are merely illustrative and susceptible to various modifications. For example, the concepts could be used in various types of mobile network, which are based on different types or combinations of RATs. Further, it is to be understood that the above concepts may be implemented by using correspondingly designed software in existing network devices, or by using dedicated network device hardware. Also, it is to be understood that each of the illustrated nodes may be implemented as single device or by multiple interacting devices, e.g., by a device cloud or other kind of distributed system.

The invention claimed is:

1. A method for controlling voice communication of a user equipment in a mobile network, the method comprising:
 maintaining a data record related to the user equipment at a subscriber database;
 receiving an indication at the subscriber database from a control node which is responsible for controlling a plurality of packet switched network accesses, the indication indicating whether voice communication with the user equipment over circuit switched access is supported or unsupported homogeneously for all the network accesses controlled by the control node;
 storing the indication in the data record at the subscriber database;
 receiving a request at the subscriber database from a termination control node which is responsible for controlling termination of a voice session with the user equipment; and
 depending on the stored indication, processing the received request at the subscriber database.

2. The method according to claim 1,
 wherein the request is a request for a circuit switched routing number of the user equipment.

3. The method according to claim 2,
 wherein said processing of the request for the circuit switched routing number at the subscriber database comprises:
 in response to the indication indicating that voice communication with the user equipment over circuit switched access is unsupported homogeneously, rejecting the request for the circuit switched routing number.

4. The method according to claim 2,
 wherein said processing of the request for the circuit switched routing number at the subscriber database comprises:
 in response to the indication indicating that voice communication with the user equipment over circuit switched access is not unsupported homogeneously, requesting the circuit switched routing number from a switching node of the mobile network.

5. The method according to claim 4, comprising:
 receiving the circuit switched routing number at the subscriber database from the switching node; and
 sending the circuit switched routing number from the subscriber database to the termination control node.

6. The method according to claim 1, comprising:
 wherein the request is a request for information whether voice communication with the user equipment over circuit switched access is supported or unsupported.

7. The method according to claim 1, comprising:
 receiving an indication of an update of the indication at the subscriber database from the control node; and
 storing the updated indication in the data record at the subscriber database.

8. A method for controlling voice communication of a user equipment in a mobile network, the method comprising:
 controlling a plurality of packet switched network accesses at a control node;
 determining at the control node whether voice communication with the user equipment over circuit switched access is supported or unsupported homogeneously for all the network accesses controlled by the control node; and
 in accordance with the determination, providing an indication from the control node to a subscriber database maintaining a data record related to the user equipment, the indication indicating whether voice communication with the user equipment over circuit switched access is supported or unsupported homogeneously.

9. The method according to claim 8,
wherein the indication is provided in response to the user equipment attaching to one of the network accesses controlled by the control node.

10. The method according to claim 8,
wherein the indication is provided in response to the user equipment moving from another network access, which is not controlled by the control node, to one of the network accesses controlled by the control node.

11. The method according to claim 8,
wherein the indication is provided in response to a change in support of voice communication with the user equipment over circuit switched access for at least one of the network accesses controlled by the control node.

12. A subscriber database for a mobile network, the subscriber database comprising:
at least one interface;
at least one processor; and
a memory for maintaining a data record related to a user equipment,
wherein the at least one processor is configured to:
receive, via the at least one interface, an indication from a control node which is responsible for controlling a plurality of packet switched network accesses, the indication indicating whether voice communication with the user equipment over circuit switched access is supported or unsupported homogeneously for all the network accesses controlled by the control node;
store the indication in the data record;
receive a request via the at least one interface from a termination control node which is responsible for controlling termination of a voice session with the user equipment; and
depending on the stored indication, process the received request.

13. The subscriber database according to claim 12,
wherein the request is a request for a circuit switched routing number of the user equipment.

14. The subscriber database according to claim 13,
wherein the at least one processor is further configured to process the request for the circuit switched routing number by:
in response to the indication indicating that voice communication with the user equipment over circuit switched access is unsupported homogeneously, rejecting the request for the circuit switched routing number.

15. The subscriber database according to claim 13,
wherein the at least one processor is further configured to process the request for the circuit switched routing number by:
in response to the indication indicating that voice communication with the user equipment over circuit switched access is not unsupported homogeneously, send a request for the circuit switched routing number via the at least one interface to a switching node of the mobile network.

16. The subscriber database according to claim 15,
wherein the at least one processor is further configured to:
receive the circuit switched routing number via the at least one interface from the switching node, and
send the circuit switched routing number via the at least one interface to the termination control node.

17. The subscriber database according to claim 12,
wherein the request is a request for information whether voice communication with the user equipment over circuit switched access is supported or unsupported.

18. The subscriber database according to claim 12,
wherein the at least one processor is further configured to:
receive, via the at least one interface, an indication of an update of the indication from the control node; and
store the updated indication in the data record.

19. A control node for a mobile network, the control node comprising:
a control interface with respect to a plurality of packet switched network accesses;
a database interface to a subscriber database maintaining a data record related to a user equipment; and
at least one processor,
wherein the at least one processor is configured to:
control the network accesses via the control interface,
determine whether voice communication with the user equipment over circuit switched access is supported or unsupported homogeneously for all the network accesses controlled by the control node; and
in accordance with the determination, provide an indication via the database interface to the subscriber database, the indication indicating whether voice communication with the user equipment over circuit switched access is supported or unsupported homogeneously.

20. The control node according to claim 19,
wherein the at least one processor is configured to provide the indication in response to the user equipment attaching to one of the network accesses controlled by the control node.

21. The control node according to claim 19,
wherein the at least one processor is configured to provide the indication in response to the user equipment moving from another network access, which is not controlled by the control node, to one of the network accesses controlled by the control node.

22. The control node according to claim 19,
wherein the at least one processor is configured provide the indication in response to a change in the support of voice communication with the user equipment for at least one of the network accesses controlled by the control node.

\* \* \* \* \*